(12) United States Patent
Tabatabaee et al.

(10) Patent No.: US 8,976,664 B2
(45) Date of Patent: Mar. 10, 2015

(54) FACILITATING NETWORK FLOWS

(71) Applicant: Broadcom Corporation, Irvine, CA (US)

(72) Inventors: Vahid Tabatabaee, Cupertino, CA (US); Bruce Hui Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 148 days.

(21) Appl. No.: 13/857,534

(22) Filed: Apr. 5, 2013

(65) Prior Publication Data

US 2014/0254385 A1   Sep. 11, 2014

Related U.S. Application Data

(60) Provisional application No. 61/775,943, filed on Mar. 11, 2013.

(51) Int. Cl.
| | |
|---|---|
| *H04L 12/26* | (2006.01) |
| *H04L 12/801* | (2013.01) |
| *H04L 12/873* | (2013.01) |
| *H04L 12/813* | (2013.01) |
| *H04L 12/933* | (2013.01) |

(52) U.S. Cl.
CPC ............. *H04L 47/11* (2013.01); *H04L 47/52* (2013.01); *H04L 47/522* (2013.01); *H04L 47/20* (2013.01); *H04L 49/15* (2013.01)
USPC .......................................................... 370/235

(58) Field of Classification Search
CPC ....... H04L 47/52; H04L 47/522; H04L 47/20; H04L 49/15; H04L 47/10; H04L 47/22; H04L 47/32; H04L 2012/5632; H04L 2012/5635; H04W 72/0406
USPC .............. 370/229, 230, 230.1, 231, 232, 233, 370/234, 235, 236.1
See application file for complete search history.

(56) References Cited

U.S. PATENT DOCUMENTS

| | | | | |
|---|---|---|---|---|
| 5,313,454 | A | * | 5/1994 | Bustini et al. .................. 370/231 |
| 8,811,153 | B1 | * | 8/2014 | Yang et al. ..................... 370/218 |
| 2006/0140119 | A1 | * | 6/2006 | Yeh et al. ....................... 370/235 |
| 2014/0301195 | A1 | * | 10/2014 | Briscoe et al. ............. 370/230.1 |

* cited by examiner

*Primary Examiner* — Raj Jain
(74) *Attorney, Agent, or Firm* — Oblon, McClelland, Maier & Neustadt, L.L.P.

(57) ABSTRACT

In various embodiments, a system includes a switch comprising a resource that is shared between multiple objects. The switch comprises circuitry that determines a congestion metric for the switch in response to an amount of used of the resource by the objects. The circuitry determines a feedback parameter that is responsive to the congestion metric. The circuitry generates a congestion notification message that comprises a congestion feedback value responsive to the feedback parameter.

In further embodiments, a system includes a switch that processes data for a first data link layer access network. The switch includes circuitry that identifies whether a received packet originated from a source device that shares the same network layer access layer as the switch. If the source device shares the same network layer access network as the switch, the circuitry generates a congestion notification message comprising a congestion feedback value for the switch.

20 Claims, 5 Drawing Sheets

FACILITATING NETWORK FLOWS

CROSS-REFERENCE TO RELATED APPLICATIONS

This application claims the benefit of and priority to U.S. Provisional Application Ser. No. 61/775,943, filed Mar. 11, 2013, which is incorporated by reference herein in its entirety.

BACKGROUND

In a networked environment, data may be transmitted between multiple computing devices. Due to various factors, a congestion point may develop in the networked environment. The congestion point may result in decreased network performance.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
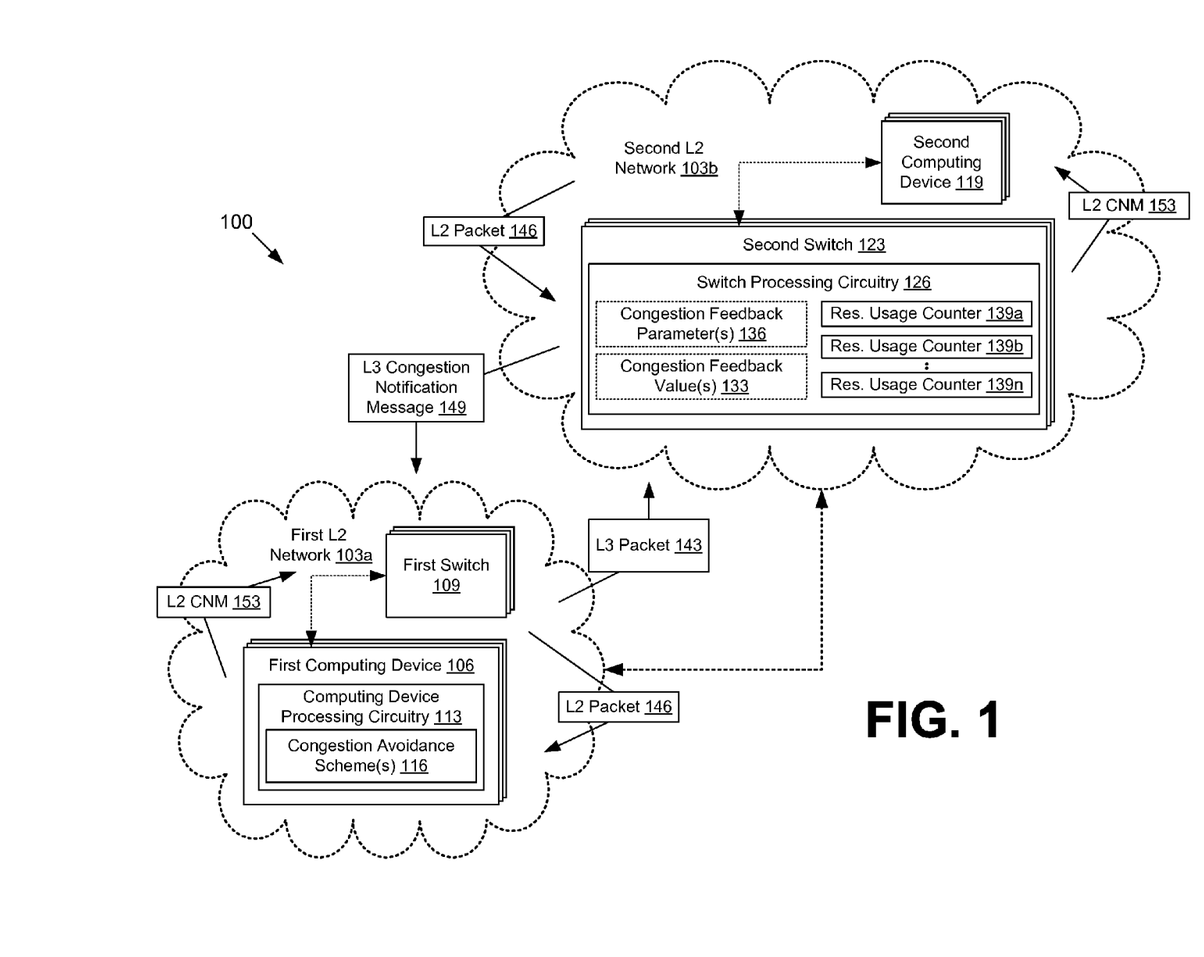
FIG. 1 is a drawing of an example of a networked environment according to various embodiments of the present disclosure.

The present disclosure relates to facilitating data flows in a networked environment. With reference to FIG. 1, shown is an example of a Layer 3 (L3) network 100 according to various embodiments. Such an L3 network 100 corresponds, for example, to the network access layer of the Open Systems Interconnection (OSI) network model. Thus, the L3 network 100 shown in FIG. 1 is an example of a network layer access network. The L3 network 100 may comprise a data center or other type of computing environment. Accordingly, the L3 network 100 may be located at a single facility or may span multiple facilities according to various embodiments.

The L3 network 100 may include a first Layer 2 (L2) network 103a, a second L2 network 103b, and potentially other components. Although the embodiment in FIG. 1 shows the first L2 network 103a and the second L2 network 103b, in alternative embodiments the L3 network 100 may comprise fewer or greater quantities of L2 networks.

The L3 network 100 employs various types of protocols to facilitate the transmission of data associated with the L3 network 100. For example, the L3 network may employ a congestion management protocol that is based at least in part on the Data Center Transmission Control Protocol (DCTCP) and/or other protocols.

The first L2 network 103a and the second L2 network 103b correspond, for example, to the data link access layer of the OSI network model. Accordingly, the first L2 network 103a and the second L2 network 103b are examples of a data link layer access networks. The first L2 network 103a and the second L2 network 103b employ various types of protocols to facilitate the transmission of data. For example, the first L2 network 103a and/or the second L2 network 103b may employ a congestion management protocol that is based at least in part on the Quantized Congestion Notification (QCN) congestion protocol and/or other protocols.

According to various embodiments, the first L2 network 103a may comprise one or more first computing devices 106, one or more first switches 109, and potentially other components. The first computing device 106 is representative of multiple computing devices that may exist in the first L2 network 103a. The first computing device 106 is operable to transmit data to various components within the first L2 network 103a. The first computing device 106 is also operable to receive data from various components within the first L2 network 103a. To this end, the first computing device 106 may be embodied in the form of a processor-based system, such as a server computer or any other type of suitable computing system.

The first computing device 106 comprises computing device processing circuitry 113 and potentially other components and/or functionality. The computing device processing circuitry 113 may, for example, facilitate the processing, transmission, and/or receiving of data. For instance, the computing device processing circuitry 113 may facilitate the first computing device 106 transmitting various types of data in accordance with various types of protocols. As non-limiting examples, the first computing device 106 may be operable to transmit and/or receive Transmission Control Protocol (TCP) data, non-TCP data, and/or other types of data. Such non-TCP data includes but is not limited to User Datagram Protocol (UDP) data and/or other types of data.

Various embodiments of the first computing device 106 may employ one or more congestion avoidance schemes 116. A congestion avoidance scheme 116 may be, for example, a process that aims to control the amount of data congestion in the first L2 network 103a, the second L2 network 103b, and/or the L3 network 100. The congestion avoidance scheme 116 may cause the data transmission rates for the first computing device 106 to increase and/or decrease in an attempt to avoid data congestion and/or increase data throughput. As a non-limiting example, one or more of the congestion avoidance schemes 116 may be based at least in part on the QCN congestion avoidance scheme.

The first switch 109 routes and relays data within the first L2 network 103a so that the data may be transferred from a source to a destination. For instance, the first switch 109 may route and relay data between multiple first computing devices 106 in the first L2 network 103a. In addition, the first switch 109 may route and/or relay data between the first L2 network 103a and the second L2 network 103b.

According to various embodiments, the first switch 109 may be operable to employ one or more of the congestion avoidance schemes 116. For instance, a congestion avoidance scheme 116 may cause the first switch 109 to increase and/or decrease a rate at which it routes and/or relays data originating from the first computing device 106. Additionally or alternatively, the first switch 109 can send or relay congestion notification messages to the first computing device 106 to cause the first computing device 106 to increase and/or decrease the rate at which the first computing device 106 transmits data to a congestion point. Additionally or alternatively, various embodiments of the first switch 109 can employ a congestion avoidance scheme 116 in which the first switch 109 transmits link-level flow control data that causes the first computing device 106 to adjust its transmission rate.

The second L2 network 103b may be similar to the first L2 network 103a. For example, various embodiments of the second L2 network 103b may comprise one or more second computing devices 119, one or more second switches 123, and/or potentially other components.

The second computing device 119 is representative of multiple computing devices that may exist in the second L2 network 103b. The second computing device 119 may be similar to the first computing device 106 in the first L2 network 103a. For example, the second computing device 119 is operable to transmit and/or receive data to and/or from various components within the second L2 network 103b. As such, the second computing device 119 may be embodied in the form of a processor-based system, such as a server computer or any other type of suitable computing system. Similar to the first computing device 106, the second computing device 119 may also comprise respective computing device processing circuitry 113 that executes one or more congestion avoidance schemes 116 and/or performs other types of functionality.

The second switch 123 may be similar to the first switch 109. For example, the second switch 123 routes and/or relays data within the second L2 network 103b so that the data may be transferred from a source to a destination. For instance, the second switch 123 may route and/or relay data between multiple second computing devices 119 in the second L2 network 103b. In addition, the second switch 123 may route and/or relay data between the second L2 network 103b and the first L2 network 103a. Additionally, the second switch 123 may employ one or more congestion avoidance schemes 116.

The second switch 123 may also comprise switch processing circuitry 126 and potentially other components and/or functionality. The switch processing circuitry 126 is representative of the components that may reside on the second switch 123 and the first switch 109, respectively. The switch processing circuitry 126 for the second switch 123 may, for example, process, route, and/or relay data that is received by the second switch 123. Additionally, the switch processing circuitry 126 may calculate one or more congestion feedback values 133. A congestion feedback value 133 may be, for example, a metric that is used to identify a level of data congestion in the second switch 123.

According to various embodiments, the congestion feedback value 133 may be responsive to one or more congestion feedback parameters 136. As non-limiting examples, one or more congestion feedback parameters 136 may be a desired resource usage by a physical or virtual object in the second switch 123, a weighting factor for the rate of change for the resource usage by the physical or virtual object in the second switch 123, or any other type of factor that may be used to determine the congestion feedback value 133. By changing one or more of the congestion feedback parameters 136, the congestion feedback value 133 may be changed. Such a resource usage may be, for example, the length of an egress queue, the length of an ingress queue, or any other type of metric.

The switch processing circuitry 126 may also include one or more resource usage counters 139a-139n. Each of the resource usage counters 139a-139n are used to obtain and/or store a value that represents, for example, the amount of a resource being used by a physical or virtual object in the second switch 123. Such a physical object may be, for example, an ingress port, an ingress queue, an egress port, an egress queue, any other type of element that exists in the second switch 123, or any combination thereof. A virtual object may be, for example, a virtual element that is defined within the second switch 123. For example, an instance of a virtual object may be a virtual queue that comprises the data packets that were received by a particular ingress port and that are to be transmitted by a particular egress port. A resource that can be used by a physical or virtual object may be, for example, memory, packet descriptors, another capability provided by the second switch 123, or any combination thereof. Additionally, a resource can be shared between multiple objects.

L3 packets 143 are transmitted within the L3 network 100. For example, L3 packets 143 may be transmitted between the first L2 network 103a and the second L2 network 103b. An L3 packet 143 may comprise, for example, control data and payload data. The control data may facilitate the transmission of the payload data between the first L2 network 103a and the second L2 network 103b.

Additionally, L2 packets 146 are transmitted within the first L2 network 103a and within the second L2 network 103a, respectively. An L2 packet 146 may comprise, for example, control data and payload data. The control data may facilitate the transmission of the payload data within the first L2 network 103a or the second L2 network 103b, respectively.

L3 congestion notification messages 149 are transmitted within the L3 network 100. For example, L3 congestion notification messages 149 may be transmitted between the first L2 network 103a and the second L2 network 103b. The L3 congestion notification messages 149 may be used, for example, to indicate one or more congestion levels within the L3 network 100. The L3 congestion notification messages 149 may comprise, for example, a congestion feedback value 133 that may be used for a congestion avoidance scheme 116. According to various embodiments, the L3 congestion notification messages 149 may be packetized into formats that are similar to the formats of the L3 packets 143.

Additionally, L2 congestion notification messages 153 may be transmitted within the first L2 network 103a and within the second L2 network 103b, respectively. An L2 congestion notification message 153 may be used, for example, to indicate one or more congestion levels within the first L2 network 103a or within the second L2 network 103b. The L2 congestion notification messages 153 may comprise, for example, a congestion feedback value 133 that may be used for a congestion avoidance scheme 116. According to various embodiments, the L2 congestion notification messages 153 may be packetized into formats that are similar to the formats of the L2 packets 146.

Next, a general discussion of an example of at least a portion of the operation of the second L2 network 103b is provided. In particular, the following discussion provides a first example of an L2 congestion notification message 153 being generated and transmitted in the second L2 network 103b. The first L2 network 103a may function similarly to the manner in which the second L2 network 103b is described below. In the following discussion, it is assumed that the second computing device 119 is transmitting a data flow comprising L2 packets 146 that are being processed, routed, and/or relayed by the second switch 123. In addition, it is assumed that values for the congestion feedback parameters 136 have been previously determined and set, for example, by a network administrator.

From time to time, the second switch 123 identifies the usage of a resource by a physical or virtual object, as indicated by one of the resource usage counters 139a-139n. For example, the switch processing circuitry 126 may periodically determine the quantity of one or more resources being consumed by an egress queue, an ingress queue, a virtual queue, and/or any other physical or virtual object. Because the resource usage indicated by the respective resource usage counters 139a-139n may be indicative of a congestion level associated with the corresponding object, the switch processing circuitry 126 may use the amount of resource usage to calculate a congestion feedback value 133.

As a non-limiting example, the switch processing circuitry 126 may use the following equation to calculate the congestion feedback value 133:

$$F = -(Q_{diff} + w*Q_{delta}),\qquad\text{[Equation 1]}$$

where F is the congestion feedback value 133, $Q_{diff}$ is the difference between the current resource usage amount as indicated by the resource usage counter 139n and a congestion feedback parameter 136 that represents the desired resource usage amount for the resource usage counter 139n, w is a congestion feedback parameter 136 representing a weighting factor, and $Q_{delta}$ is the difference between the current resource usage amount indicated by the resource usage counter 139n and the resource usage amount indicated by the resource usage counter 139n when the congestion feedback value 133 was previously calculated. Thus, equation 1 may be expressed using the following equation:

$$F = -((Q - Q_{des}) + w*(Q - Q_{prev})),\qquad\text{[Equation 2]}$$

where F is the congestion feedback value 133, Q is the current resource usage amount indicated by the resource usage counter 139n, $Q_{des}$ is a congestion feedback parameter 136 representing the desired resource usage amount for the resource usage counter 139n, w is a congestion feedback parameter 136 representing a weighting factor, and $Q_{prev}$ is the resource usage amount indicated by the resource usage counter 139n when F was previously calculated.

Additionally, the switch processing circuitry 126 samples the data associated with the resource usage counter 139n to identify the one or more sources of the data that is associated with the resource usage counter 139n. For example, the switch processing circuitry 126 may, parse at least a portion of the header for an L2 packet 146 that is being buffered in an egress queue monitored by the resource usage counter 139n to obtain information that identifies the source of the L2 packet 146. For example, the header may comprise the Internet Protocol (IP) address of the source of the data that is associated with the resource usage counter 139n.

Once the source of the data has been identified and the congestion feedback value 133 has been determined, the switch processing circuitry 126 may initiate the process of generating an L2 congestion notification message 153. For example, the switch processing circuitry 126 may packetize various data that is to be included with the L2 congestion notification message 153. Such data may comprise, for example, an identification of the source of the L2 congestion notification message 153, an identification of the destination of the L2 congestion notification message 153, the congestion feedback value 133, at least a portion of the L2 packet 146 that is associated with the resource usage counter 139n, and/or potentially other information. The identification of the source of the L2 congestion notification message 153 may be, for example, the IP address of the second switch 123, and the identification of the destination of the L2 congestion notification message 153 may be, for example, the IP address of the second computing device 119. Once the L2 congestion notification message 153 has been generated, the second switch 123 may transmit the L2 congestion notification message 153 to the second computing device 119.

After the L2 congestion notification message 153 has been transmitted by the second switch 123, the second computing device 119 obtains the L2 congestion notification message 153. The second computing device 119 may then parse at least a portion of the L2 congestion notification message 153 to obtain various information. For instance, the second computing device 119 may identify the congestion feedback value 133. Additionally, the second computing device 119 may identify the data flow that is being transmitted by the second computing device 119 and that corresponds to the L2 congestion notification message 153. In this regard, the second computing device 119 may identify the data flow providing the L2 packets 146 that are contributing to the congestion indicated by the L2 congestion notification message 153.

The second computing device 119 may employ a congestion avoidance scheme 116 that uses the congestion feedback value 133 that was transmitted by the second switch 123. For example, a congestion avoidance scheme 116 for the second switch 123 may use the congestion feedback value 133 to determine the amount that the second computing device 119 is to decrease the transmission rate of the data flow that is contributing to the identified congestion. Alternatively, the congestion feedback value 133 may indicate that the second computing device 119 can increase the corresponding transmission rate. Because the second computing device 119 may have identified the data flow that provided the L2 packets 146 that contributed to the congestion indicated by the L2 congestion notification message 153, the second computing device 119 may adjust the corresponding transmission rate responsive to the congestion feedback value 133 that was received in the L2 congestion notification message 153. The process described above may be repeated for all of the resource usage counters 139a-139n.

Next, another general discussion of an example of at least a portion of the operation of the second L2 network 103b is provided. In particular, the following discussion provides a second example of an L2 congestion notification message 153 being generated and transmitted in the second L2 network 103b. The first L2 network 103a may function similarly to the manner in which the second L2 network 103b is described below. In the following discussion, it is assumed that the second computing device 119 is transmitting a data flow comprising L2 packets 146 that are being processed, routed, and/or relayed by the second switch 123. In addition, it is assumed that the values for the congestion feedback parameters 136 have not been determined or have been set at initialized values.

From time to time, the switch processing circuitry 126 identifies the total usage for one or more resources in the second switch 123 that can be shared between multiple physical or virtual objects. To this end, the switch processing circuitry 126 may identify the resource usage indicated by multiple resource usage counters 139a-139n. For example, the switch processing circuitry 126 may use the resource usage counters 139a-139n to identify the total amount of data being buffered in a memory shared by multiple egress queues.

The switch processing circuitry 126 also determines a congestion metric in response to the resource usage indicated by the resource usage counters 139a-139n that are associated with multiple objects that share a common resource. As non-limiting examples, such a congestion metric may be a value that represents the quantity of data being buffered, the quantity of additional data that a memory is capable of buffering, or any other type of metric that is based at least in part on the resource usage. The congestion metric may, for example, represent a level of congestion for the second switch 123.

The switch processing circuitry 126 then associates the second switch 123 with a congestion state in response to the determined congestion metric. To this end, there may be multiple congestion states that are defined, and the switch processing circuitry 126 may select one of the congestion states based at least in part on the congestion metric for the second switch 123. As a non-limiting example, a "low" congestion state, a "medium" congestion state, a "high" congestion state, and/or potentially other congestion states may be defined according to various embodiments. For example, if the congestion metric for the second switch 123 is less than a first predetermined threshold, the switch processing circuitry 126 may associate the second switch 123 with the "low" congestion state. If the congestion metric for the second switch 123 is greater than a second predetermined threshold, the switch processing circuitry 126 may associate the second switch 123 with the "high" congestion state. If the congestion metric for the second switch 123 is within the first threshold and the second threshold, the switch processing circuitry 126 may associate the second switch 123 with the "medium" congestion state.

According to various embodiments, various values for the congestion feedback parameters 136 may correspond to the various congestion states. As a non-limiting example, a first set of one or more values for the congestion feedback parameters 136 may correspond to the "low" congestion state, a second set of one or more values for the congestion feedback parameters 136 may correspond to the "medium" congestion state, a third set of one or more values for the congestion feedback parameters 136 may correspond to the "high" congestion state, and so forth.

Using the values for the congestion feedback parameters 136 that correspond to the identified congestion state, the switch processing circuitry 126 may determine a congestion feedback value 133. To this end, equation 1, equation 2, and/or potentially other methods may be used to determine the congestion feedback value 133.

Additionally, the switch processing circuitry 126 may sample packets that are associated with one of the resource usage counters 139a-139n to identify the one or more sources of the data that are contributing towards the resource usage. To this end, the switch processing circuitry 126 may, for example, parse at least a portion of the data for an L2 packet 146 that is associated with one of the resource usage counters 139a-139n to obtain data that identifies the source of the L2 packet 146. For example, the packet associated with the resource usage counter 139n may comprise the IP address of the data source.

Once the source of the sampled packet has been identified and the congestion feedback value 133 has been determined, the switch processing circuitry 126 initiates the process of generating an L2 congestion notification message 153. For example, the switch processing circuitry 126 may packetize various data that is to be included with the L2 congestion notification message 153, similar to as previously described.

In various embodiments, there may be one or more rules that correspond to the various congestion states. As a non-limiting example, a rule may specify that the switch processing circuitry 126 is not to generate and/or transmit L2 congestion notification messages 153 and/or L3 congestion notification messages 149 if the second switch 123 is associated with the "low" congestion state. As another example, a rule may specify that the switch processing circuitry 126 is to generate and/or transmit L2 congestion notification messages 153 and/or L3 congestion notification messages 149 if the second switch 123 is associated with the "medium" congestion state or the "high" congestion state. Thus, whether an L2 congestion notification message and/or an L3 congestion notification message is generated may be determined in accordance with the one or more corresponding rules.

In the event that the second switch 123 transmits an L2 congestion notification message 153, the second computing device 119 receives the L2 congestion notification message 153. The second computing device 119 then parses at least a portion of the L2 congestion notification message 153 to obtain various data. For example, the second computing device 119 may identify the congestion feedback value 133, the data flow that is providing the L2 packets 146 that are contributing to the congestion indicated by the L2 congestion notification message 153, and potentially other data.

As discussed above, the second computing device 119 may use the congestion feedback value 133 for a congestion avoidance scheme 116. For example, the second computing device 119 may decrease or increase the transmission rate of the data flow that is contributing to the identified congestion. The amount of such a decrease or increase may be responsive to the congestion feedback value 133.

Next, a general discussion of an example of at least a portion of the operation of the L3 network 100 is provided. In particular, the following discussion provides an example of an L3 congestion notification message 149 being generated in the second L2 network 103b and transmitted to the first L2 network 103a. An L3 congestion notification message 149 may be generated in the first L2 network 103a and transmitted to the second L2 network 103b in ways that are similar to the manner in which the process is described below. In the following discussion, it is assumed that the first computing device 106 is transmitting a data flow to the second computing device 119 and that the second switch 123 is receiving and processing the corresponding data.

From time to time, the switch processing circuitry 126 in the second switch 123 determines a congestion feedback value 133. The congestion feedback value 133 may be responsive to, for example, the congestion feedback parameters 136, the resource usage indicated by one or more of the resource usage counters 139a-139b, and/or potentially other information. According to various embodiments, one or more of the processes described above, for example, may be used to determine the congestion feedback value 133.

The switch processing circuitry 126 also samples the data packets associated with the resource usage counter 139n. Using the sampled packet, the switch processing circuitry 126 identifies various information attributes of the packet. For example, the switch processing circuitry 126 may identify the source of the data. Additionally, the switch processing circuitry 126 may use the data to identify whether the source of the data exists within the same L3 network 100 as the second computing device 119. To this end, various embodiments of the switch processing circuitry 126 may identify, for example, whether a payload source IP address indicates that the source is within the same L3 network 100. If the source of the sampled data is outside of the L3 network 100, the switch processing circuitry 126 may decide to forego the process of generating and transmitting an L3 congestion notification message 149. Otherwise, the switch processing circuitry 126 may decide to generate and transmit an L3 congestion notification message 149.

The switch processing circuitry 126 also identifies whether the source of the sampled data is operable to respond to L3 congestion notification messages 149 that the second switch 123 may generate. According to various embodiments, the L3 packets 143 and/or the L2 packets 146 may include an indicator, such as one or more flags, one of more bits, or any other type of marking, that may indicate that the source of the sampled data is operable to respond to L3 congestion notification messages 149. As such, the switch processing circuitry 126 may parse the data packet associated with the resource usage counter 139n to identify whether one or more flags, one or more bits, or any other type of marking associated with the data indicates that the source is operable to respond to an L3 congestion notification message 149. If it is determined that the source of the data is not operable to respond to an L3 congestion notification message 149, the switch processing circuitry 126 may decide to forego the process of generating an L3 congestion notification message 149 for the sampled data. Otherwise, the switch processing circuitry 126 may decide to generate and transmit an L3 congestion notification message 149.

The switch processing circuitry 126 may consider other attributes associated with the sampled data when determining whether to generate and transmit an L3 congestion notification message 149 for the sampled data. For example, the switch processing circuitry 126 may consider priority information, Class of Service (CoS) information, or other information indicated by the sampled data. Because the L3 congestion notification message 149 may result in the source reducing its transmission rate of a data flow, the switch processing circuitry 126 may decide to forego generating an L3 congestion notification message 149 for data indicating that it is associated with a particular priority or CoS. Additionally, the sampled data may include information that identifies the type of protocol employed by the data, and the switch processing circuitry 126 may determine whether to generate an L3 congestion notification message 149 based at least in part on the protocol type.

If the switch processing circuitry 126 determines to generate an L3 congestion notification message 149, the switch processing circuitry 126 packetizes the L3 congestion notification message 149 so that it comprises various types of data. As non-limiting examples, the L3 congestion notification message 149 may include the congestion feedback value 133, one or more of the congestion feedback parameters 136, the destination of the sampled data associated with the resource usage counter 139n, the address of the second switch 123, at least a portion of the payload associated with the sampled data, and/or potentially other information.

The second switch 123 then transmits the L3 congestion notification message 149 from the second L2 network 103b to the first L2 network 103a. In response to obtaining the L3 congestion notification message 149, the first switch 109 in the first L2 network 103a may route and/or relay at least a portion of the L3 congestion notification message 149 to the first computing device 106.

The first computing device 106 then executes a congestion avoidance scheme 116 using various data included with the L3 congestion notification message 149. For example, the computing device processing circuitry 113 may increase or decrease a transmission rate responsive to the congestion feedback value 133 indicated by the L3 congestion notification message 149. Additionally or alternatively, if the first computing device 106 employs multi-path routing, the computing device processing circuitry 113 may determine to avoid using the second switch 123 to transmit data. Thus, the second switch 123 may transmit an L3 congestion notification message 149 from the second L2 network 103b to the first L2 network 103a, and the first computing device 106 may adjust a transmission in response to the L3 congestion notification message 149.

In alternative embodiments, the first switch 109 obtains the L3 congestion notification message 149 and adjusts the routing and/or relay rate of data from the first computing device 106 responsive the congestion feedback value 133 and/or other data represented in the L3 congestion notification message 149. Additionally or alternatively, in response to the congestion feedback value 133 and/or other data in the L3 congestion notification message 149, the first switch 109 may send link-level flow control messages to the first computing device 106 to cause the first computing device 106 to adjust its transmission rate. As such, the first switch 109 may act as a congestion avoidance proxy for the first computing device 106 by adjusting the transmission rate of data that originated from the first computing device 106.

Figure 2:
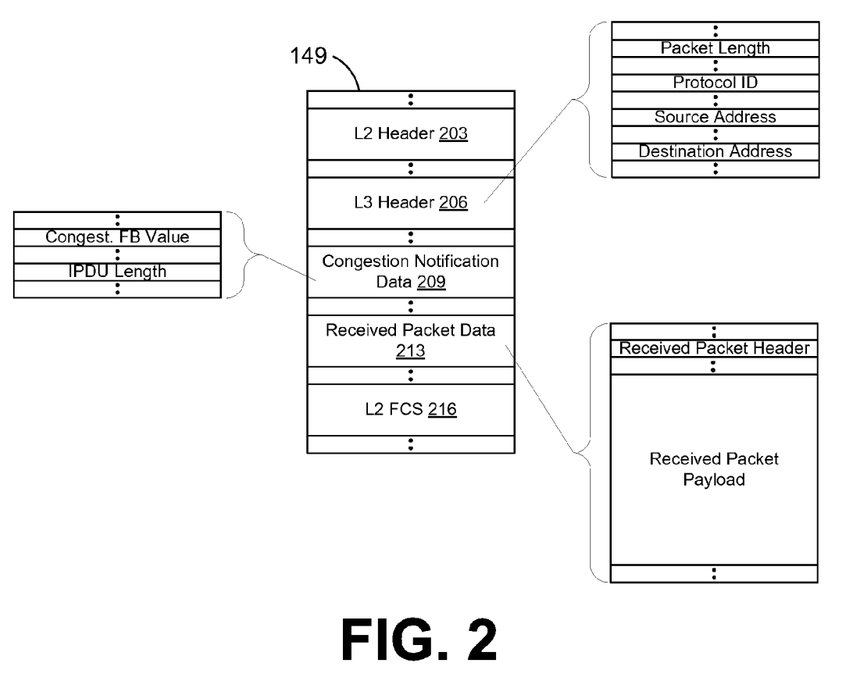
FIG. 2 is a drawing of an example of a congestion notification message generated by a switch in the networked environment of FIG. 1 according to various embodiments of the present disclosure.

With reference to FIG. 2, shown is a drawing of an example of an L3 congestion notification message 149 according to various embodiments of the present disclosure. The L3 congestion notification message 149 in the embodiment of FIG. 2 comprises, for example, an L2 header 203, an L3 header 206, congestion notification data 209, received packet data 213, an L2 frame check sequence 216, and/or potentially other data.

The L3 header 206 may comprise, for example, data that may be used to facilitate transmission of the L3 congestion notification message 149 across the L3 network 100 (FIG. 1). For example, the L3 header 206 may comprise data that indicates the source of the L3 congestion notification message 149, the destination of the L3 congestion notification message 149, and potentially other information. For example, the L3 header 206 in the embodiment of FIG. 2 includes data representing the packet length, a protocol identifier, the address of the source of the L3 congestion notification message 149, the address of the destination of the L3 congestion notification message 149, and/or potentially other data. The destination of the L3 congestion notification message 149 may be, for example, the source address of a sampled packet in the second switch 123.

The congestion notification data 209 may comprise, for example, data that may be useful for execution of a congestion avoidance scheme 116 (FIG. 1). For example, the embodiment of FIG. 2 includes data representing the congestion feedback value 133 (FIG. 1), the length of the IP Data Unit (IPDU), and/or potentially other information. The received packet data 213 may include at least a portion of the data that was sampled by the second switch 123, for example. For example, the received packet data 213 in the embodiment of FIG. 2 includes the original packet header and at least a portion of the original received packet payload that was sampled by the second switch 123. The L2 frame check sequence 216 may comprise data useful for error detection, error correction, and/or other purposes.

Figure 3:
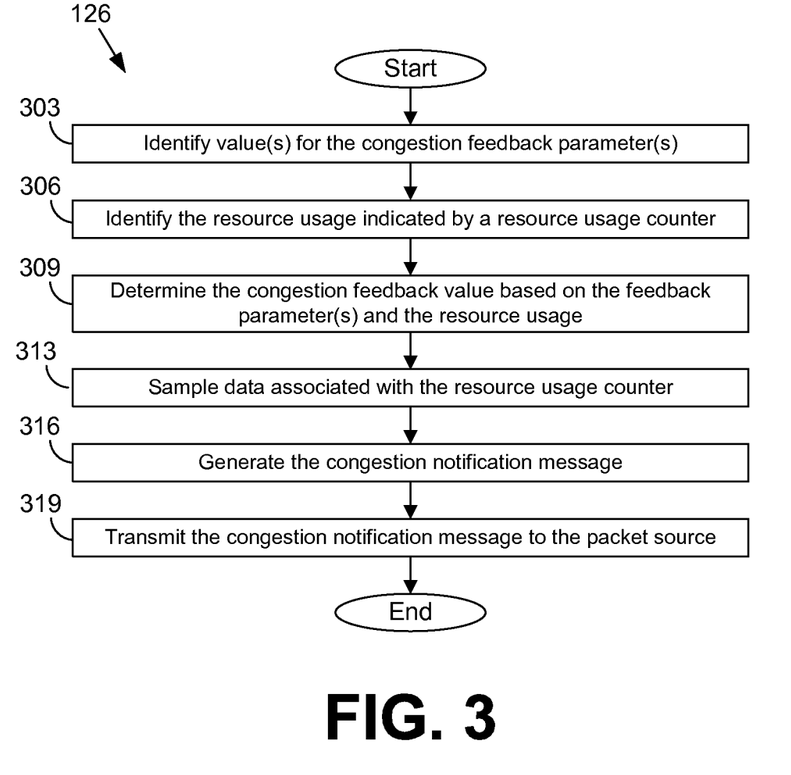
FIGS. 3-5 are flowcharts illustrating examples of functionality implemented by a switch in the networked environment of FIG. 1 according to various embodiments of the present disclosure.

Referring to FIG. 3, shown is a flowchart illustrating an example of at least a portion of the functionality implemented by the switch processing circuitry 126 according to various embodiments of the present disclosure. In particular, the flowchart of FIG. 3 illustrates a first example of the switch processing circuitry 126 generating L2 congestion notification messages 1539 (FIG. 1) or L3 congestion notification messages 149 (FIG. 1). It is understood that the flowchart of FIG. 3 provides merely an example of the many different types of functionality that may be implemented by the switch processing circuitry 126 as described herein. Additionally, the flowchart of FIG. 3 may be viewed as depicting an example of steps of a method implemented in the second switch 123 (FIG. 1) according to one or more embodiments.

Beginning at reference number 303, the switch processing circuitry 126 identifies the values for one or more congestion feedback parameters 136 (FIG. 1). These values may have been determined, for example, by a network administrator. As indicated at reference number 306, the switch processing circuitry 126 identifies the resource usage indicated by one of the resource usage counters 139a-139n (FIG. 1). The switch processing circuitry 126 then determines a congestion feedback value 133 responsive to the congestion feedback parameters 136 and the resource usage indicated by the one of the resource usage counters 139*a*-139*n*, as shown at reference number 309. To this end, equation 1, equation 2, and/or any other suitable process may be used to determine the congestion feedback value 133.

As indicated at reference number 313, the switch processing circuitry 126 then samples data, such as an L2 packet 146 (FIG. 1), that is associated with the one of the resource usage counters 139*a*-139*n*. The switch processing circuitry 126 then generates an L2 congestion notification message 153 or an L3 congestion notification message 149 according to various embodiments, as indicated at reference number 316. An L2 congestion notification message 153 may be generated, for example, if the destination of the notification is within the second L2 network 103*b*. An L3 congestion notification message 149 may be generated, for example, if the destination of the notification is in the first L2 network 103*a*.

The switch processing circuitry 126 then transmits the L2 congestion notification message 153 or the L3 congestion notification message 149, as indicated at reference number 319. Thereafter, the process ends.

Figure 4:
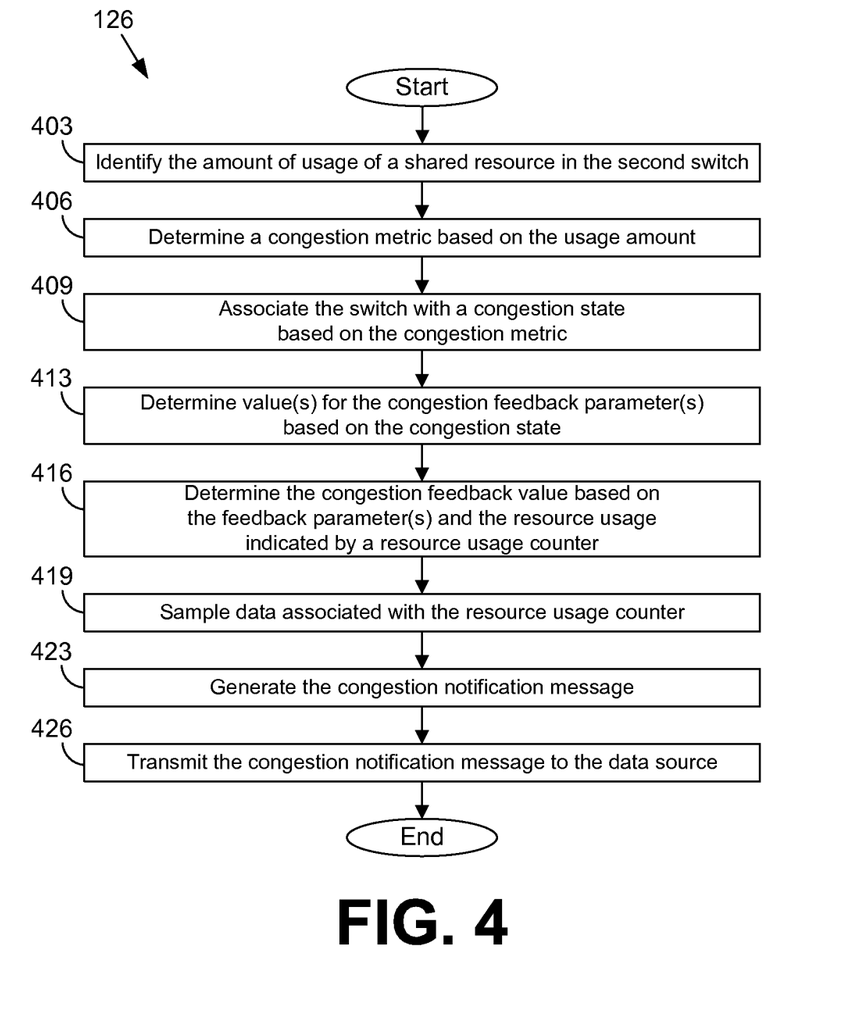

Referring to FIG. 4, shown is a flowchart illustrating an example of at least a portion of the functionality implemented by the switch processing circuitry 126 according to various embodiments of the present disclosure. In particular, the flowchart of FIG. 4 illustrates a second example of the switch processing circuitry 126 generating L2 congestion notification messages 153 (FIG. 1) or L3 congestion notification messages 149 (FIG. 1). It is understood that the flowchart of FIG. 4 provides merely an example of the many different types of functionality that may be implemented by the switch processing circuitry 126 as described herein. Additionally, the flowchart of FIG. 4 may be viewed as depicting an example of steps of a method implemented in the second switch 123 (FIG. 1) according to one or more embodiments.

Beginning at reference number 403, the switch processing circuitry 126 identifies the amount of usage of a shared resource in the second switch 123. To this end, the combined resource usage as indicated by multiple resource usage counters 139*a*-139*n* may be identified. As indicated at reference number 406, a congestion metric is determined in response to the amount of usage of the shared resource. The congestion metric according to various embodiments may be, for example, a value that represents the quantity of data in memory shared by multiple egress queues for the second switch 123.

The switch processing circuitry 126 then associates the second switch 123 with a congestion state responsive to the congestion metric, as shown at reference number 409. As non-limiting examples, there may be a "low" congestion state, a "medium congestion state, a "high" congestion state, and/or potentially other congestion states.

As indicated at reference number 413, values for one or more of the congestion feedback parameters 136 (FIG. 1) are determined responsive to the associated congestion state. For example, predefined values for the congestion feedback parameters 136 may correspond to the various congestion states. Next, as shown at reference number 416, the congestion feedback value 133 (FIG. 1) is determined responsive to the congestion feedback parameters 136, the resource usage indicated by one of the resource usage counters 139*a*-139*n*, and potentially other data.

The switch processing circuitry 126 then samples data that corresponds to the one of the resource usage counters 139*a*-139*n*, as shown at reference number 419. As indicated at reference number 423, an L2 congestion notification message 153 or an L3 congestion notification message 149 is then generated. An L2 congestion notification message 153 may be generated, for example, if the destination of the notification is within the second L2 network 103*b*. An L3 congestion notification message 149 may be generated, for example, if the destination of the notification is in the first L2 network 103*a*.

As indicated at reference number 426, the L2 congestion notification message 153 or the L3 congestion notification message 149 is then transmitted to the source of the data that was sampled from the one of the resource usage counters 139*a*-139*n*. Thereafter, the process ends.

Figure 5:
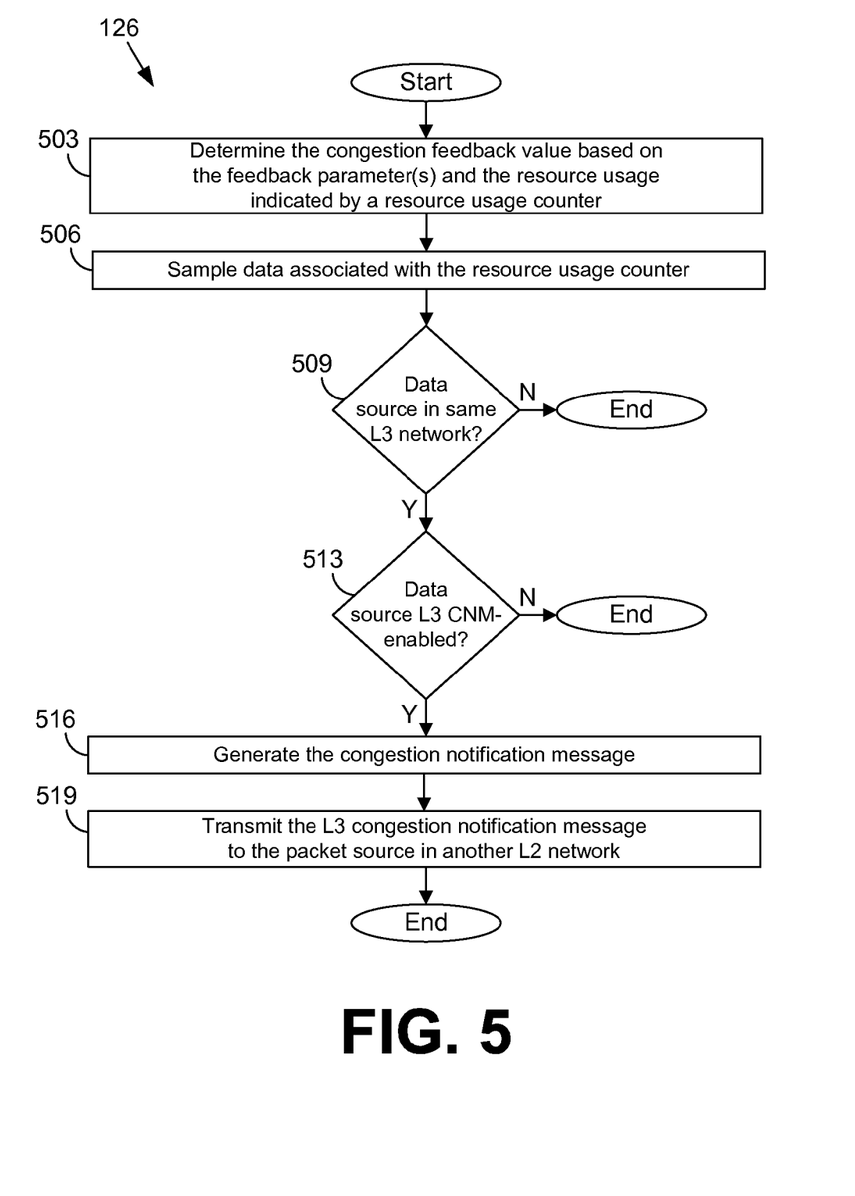

Referring to FIG. 5, shown is a flowchart illustrating an example of at least a portion of the functionality implemented by the switch processing circuitry 126 according to various embodiments of the present disclosure. In particular, the flowchart of FIG. 5 illustrates an example of the switch processing circuitry 126 generating an L3 congestion notification message 149 (FIG. 1). It is understood that the flowchart of FIG. 5 provides merely an example of the many different types of functionality that may be implemented by the switch processing circuitry 126 as described herein. Additionally, the flowchart of FIG. 5 may be viewed as depicting an example of steps of a method implemented in the second switch 123 (FIG. 1) according to one or more embodiments.

Beginning at reference number 503, the switch processing circuitry 126 determines the congestion feedback value 133 in response to one or more congestion feedback parameters 136 and/or the resource usage indicated by one or more of the resource usage counters 139*a*-139*n*. For example, equation 1, equation 2, or any other process may be used to determine the congestion feedback value 133.

As indicated at reference number 506, data associated with one of the resource usage counters 139*a*-139*n* is sampled by the switch processing circuitry 126. The switch processing circuitry 126 then identifies whether the source of the sampled data is within the same L3 network 100 as the second switch 123, as indicated at reference number 509. If the source of the data is outside of the L3 network 100, the process ends. Otherwise, the switch processing circuitry 126 identifies whether the source of the sampled data is operable to respond to an L3 congestion notification message 149, as shown at reference number 513. If the source of the data is identified as not being operable to respond to the L3 congestion notification message 149, the process ends.

Otherwise, the L3 congestion notification message 149 is generated, as shown at reference number 516. As indicated at reference number 519, the L3 congestion notification message 149 is transmitted from the second L2 network 103*b* (FIG. 1) to the first L2 network 103*a* (FIG. 1). Thereafter, the process ends.

Although the flowcharts of FIGS. 3-5 show a specific order of execution, it is understood that the order of execution may differ from that which is depicted. For example, the order of execution of two or more items may be switched relative to the order shown. Also, two or more items shown in succession may be executed concurrently or with partial concurrence. Further, in some embodiments, one or more of the items shown may be skipped or omitted. Additionally, one or more items shown in one flow chart may be executed concurrently or partially concurrently with one or more items shown in another flowchart. In addition, any number of elements might be added to the logical flow described herein, for purposes of enhanced utility, accounting, performance measurement, providing troubleshooting aids, etc. It is understood that all such variations are within the scope of the present disclosure.

The components described herein may be implemented by circuitry. In this regard, such circuitry may be arranged to perform the various functionality described above by generating and/or responding to electrical or other types of signals. The circuitry may be general purpose hardware or hardware that is dedicated to performing particular functions. The circuitry may include, but is not limited to, discrete components, integrated circuits, or any combination of discrete components and integrated circuits. Such integrated circuits may include, but are not limited to, one or more microprocessors, system-on-chips, application specific integrated circuits, digital signal processors, microcomputers, central processing units, programmable logic devices, state machines, other types of devices, and/or any combination thereof. The circuitry may also include interconnects, such as lines, wires, traces, metallization layers, or any other element through which components may be coupled. Additionally, the circuitry may be configured to execute software to implement the functionality described herein.

Also, component and/or functionality described herein, including the switch processing circuitry 126 and the computing device processing circuitry 113, can be embodied in any computer-readable medium, such as a non-transitory medium or a propagation medium, for use by or in connection with a system described herein. In this sense, the logic may comprise, for example, statements including instructions and declarations that can be fetched from the computer-readable medium and executed by the instruction execution system. In the context of the present disclosure, a "computer-readable medium" can be any medium that can propagate, contain, store, or maintain the logic, functionality, and/or application described herein.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
 a switch comprising a resource shared between a plurality of objects in the switch, the switch comprising circuitry operable to:
  determine a congestion metric for the switch in response to an amount of usage of the resource by the plurality of objects;
  determine a feedback parameter that is responsive to the congestion metric; and
  generate a congestion notification message comprising a congestion feedback value that is responsive to the feedback parameter.

2. The system of claim 1, wherein the circuitry is operable to:
 associate the switch with a congestion state in response to the congestion metric; and
 set the feedback parameter to be a value that corresponds to the congestion state.

3. The system of claim 1, wherein the circuitry is operable to:
 identify whether the congestion metric is within a predefined window; and
 set the feedback parameter to be a value that corresponds to the predefined window.

4. The system of claim 1, wherein the circuitry is operable to transmit the congestion notification message to a source device that is a source of at least a portion of the data for at least one of the objects.

5. The system of claim 1, wherein the feedback parameter comprises a desired resource usage amount.

6. The system of claim 1, wherein the feedback parameter comprises a weighting factor for a resource usage change rate.

7. The system of claim 1, wherein the congestion feedback value controls a transmission rate for a source device that is a source of at least a portion of the data for at least one of the objects.

8. A method, comprising:
 identifying, using a switch, a first usage amount of a resource by a first object in the switch;
 identifying, using the switch, a second usage amount of the resource indicated by a second object in the switch;
 determining, using the switch, a congestion metric responsive to the first usage amount and the second usage amount; and
 determining, using the switch, a feedback parameter responsive to the congestion metric.

9. The method of claim 8, further comprising generating a congestion notification message comprising a feedback value that is responsive to the feedback parameter.

10. The method of claim 8, wherein a congestion notification message is generated in response to the congestion metric exceeding a predetermined threshold.

11. The method of claim 8, further comprising:
 associating, using the switch, the switch with a congestion state responsive to the congestion metric;
 setting, using the switch, the feedback parameter to be a value that corresponds to the congestion state.

12. The method of claim 8, further comprising calculating a feedback value using the feedback parameter.

13. The method of claim 8, wherein the feedback parameter comprises a desired resource usage.

14. The method of claim 8, wherein the feedback parameter comprises a weighting factor for a resource usage change rate.

15. A system, comprising:
 a switch operable to process data for a first data link layer access network, the switch comprising circuitry operable to:
  identify whether a received packet originated from a source device that shares a same network layer access network as the switch;
  in response to the source device sharing the same network layer access network as the switch, generate a congestion notification message that comprises a congestion feedback value for the switch; and
  transmit the congestion notification message from the first data link layer access network to a computing device in a second data link layer access network.

16. The system of claim 15, wherein the circuitry is operable to:
- identify whether the received packet indicates that the source device is operable to respond to the congestion notification message; and
- in response to the received packet indicating that the source device is operable to respond to the congestion notification message, generate the congestion notification message.

17. The system of claim 15, wherein the circuitry is operable to cause the source device to adjust a transmission rate in response to the congestion feedback value.

18. The system of claim 15, wherein the circuitry is operable to cause an additional switch to adjust a transmission rate in response to the congestion feedback value, the additional switch being in the second data link layer access network.

19. The system of claim 15, wherein the circuitry is operable to generate the congestion feedback value responsive to a resource usage for the switch.

20. The system of claim 15, wherein the circuitry is operable to transmit at least a portion of the received packet in conjunction with the congestion notification message.

* * * * *